(12) United States Patent
Lu et al.

(10) Patent No.: US 12,141,336 B2
(45) Date of Patent: Nov. 12, 2024

(54) SECURE TAMPER RESISTANT DATA PROCESSING, STORAGE, AND TRANSMISSION GATEWAY AND CONTROLLER AND DATA ANOMALY DETECTION PROGRAM

(71) Applicant: H2Ok Innovations Inc., Millbrae, CA (US)

(72) Inventors: David Yang Lu, Millbrae, CA (US); Annie Jieying Lu, Millbrae, CA (US); Joseph Michael Sanchez, Jr., Cambridge, MA (US); Edward Jitong Liu, Santa Barbara, CA (US)

(73) Assignee: H2Ok Innovations Inc., Millbrae, CA (US)

( * ) Notice: Subject to any disclaimer, the term of this patent is extended or adjusted under 35 U.S.C. 154(b) by 231 days.

(21) Appl. No.: 17/952,073

(22) Filed: Sep. 23, 2022

(65) Prior Publication Data

US 2023/0104923 A1    Apr. 6, 2023

Related U.S. Application Data

(60) Provisional application No. 63/248,352, filed on Sep. 24, 2021.

(51) Int. Cl.
*G06F 21/86* (2013.01)
*H04L 9/40* (2022.01)

(52) U.S. Cl.
CPC .......... *G06F 21/86* (2013.01); *H04L 63/0876* (2013.01); *H04L 63/105* (2013.01); *G06F 2221/034* (2013.01)

(58) Field of Classification Search
CPC . G06F 21/86; G06F 2221/034; H04L 63/105; H04L 63/0876

(Continued)

(56) References Cited

U.S. PATENT DOCUMENTS 8,376,760 B1 * 2/2013 Kostrzewski .......... G06F 21/86
439/138
10,430,737 B2 10/2019 Yenni et al.
(Continued)

FOREIGN PATENT DOCUMENTS

WO      WO 15/001041 A1     1/2015

OTHER PUBLICATIONS

[No Author Listed], Case Tamper Detection Reference Design Using Inductive Sensing. TI Designs: TIDA-01377. Jun. 2017. 48 pages.

(Continued)

*Primary Examiner* — Teshome Hailu
(74) *Attorney, Agent, or Firm* — Wolf, Greenfield & Sacks, P.C.

(57) ABSTRACT

Tamper-proof gateways are described. A gateway comprises a date intake module, a data transmission module, a tamper switch and a controller. The data intake module couples to one or more data generation devices. The data transmission module is configured to transmit sense information generated by the one or more data generation devices to a network. The tamper switch is configured to generate an alert signal in response to sensing tampering of the tamper-proof gateway. The controller is configured to: 1) place the tamper-proof gateway in a secure state in response to receiving the alert signal from the tamper switch, and 2) withdraw the tamper-proof gateway from the secure state in response to receiving authentication information. Withdrawing the gateway from the secure state may comprise placing the tamper-proof gateway in a first privileged state or a second privileged state.

25 Claims, 7 Drawing Sheets

(58) Field of Classification Search
USPC ............................................................ 726/4
See application file for complete search history.

(56) References Cited

U.S. PATENT DOCUMENTS

| | | | |
|---|---|---|---|
| 11,030,871 | B2 | 6/2021 | Wedig et al. |
| 2006/0026441 | A1* | 2/2006 | Aaron .................. H04L 63/123 |
| | | | 713/187 |
| 2008/0123288 | A1 | 5/2008 | Hillis |
| 2008/0204272 | A1 | 8/2008 | Ehrke et al. |
| 2016/0197949 | A1* | 7/2016 | Nyhuis ............... H04L 63/1416 |
| | | | 713/190 |
| 2018/0033226 | A1* | 2/2018 | Robertson ........... H04L 63/0876 |
| 2018/0054490 | A1 | 2/2018 | Wadhwa et al. |
| 2021/0110368 | A1 | 4/2021 | Jones |
| 2021/0320948 | A1* | 10/2021 | Eterovic Alliende ... G06F 21/86 |

OTHER PUBLICATIONS

International Search Report and Written Opinion mailed Jan. 3, 2023, in connection with International Application No. PCT/US22/44606.

PCT/US22/44606, Jan. 3, 2023, International Search Report and Written Opinion.

* cited by examiner

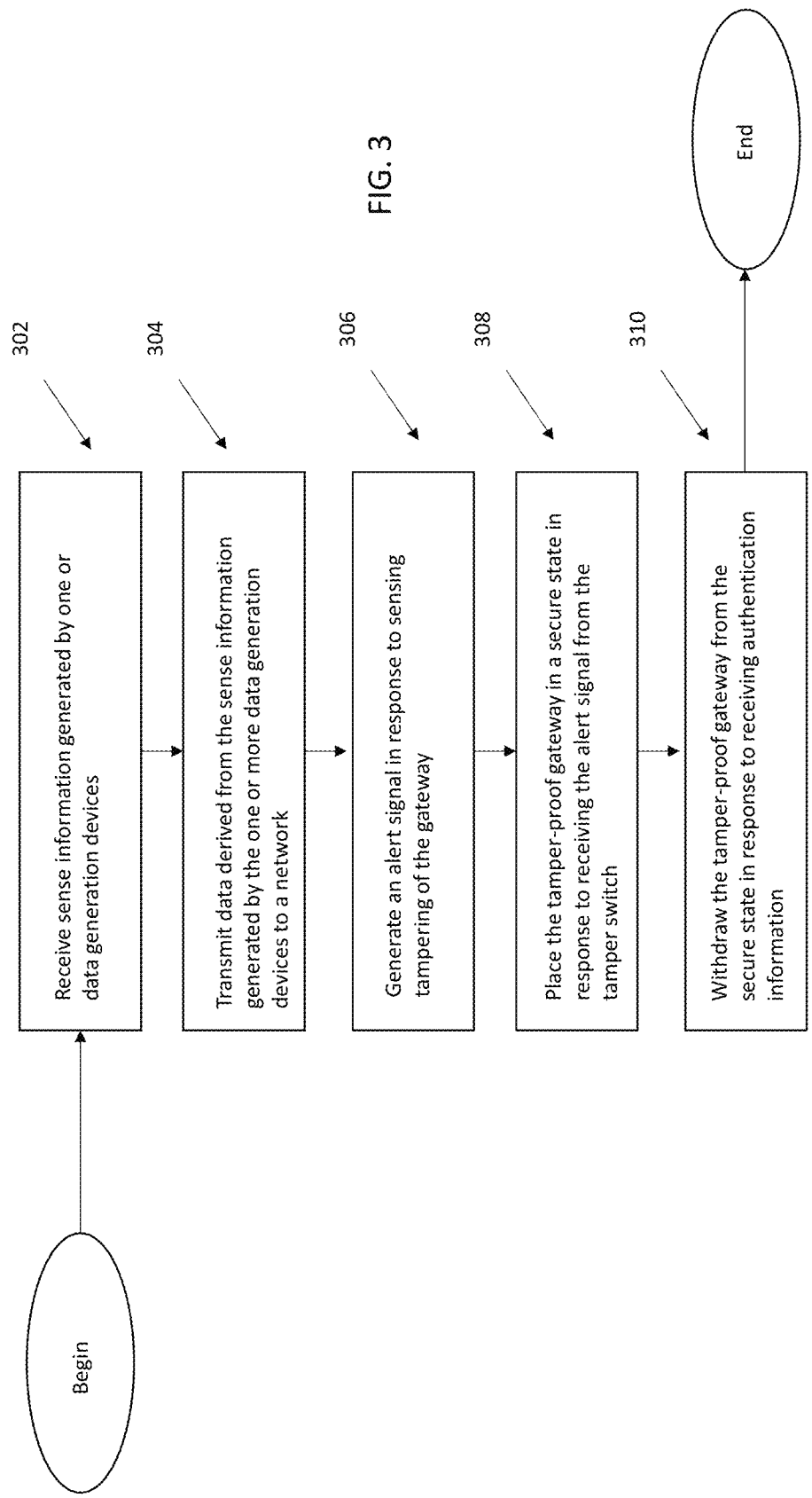

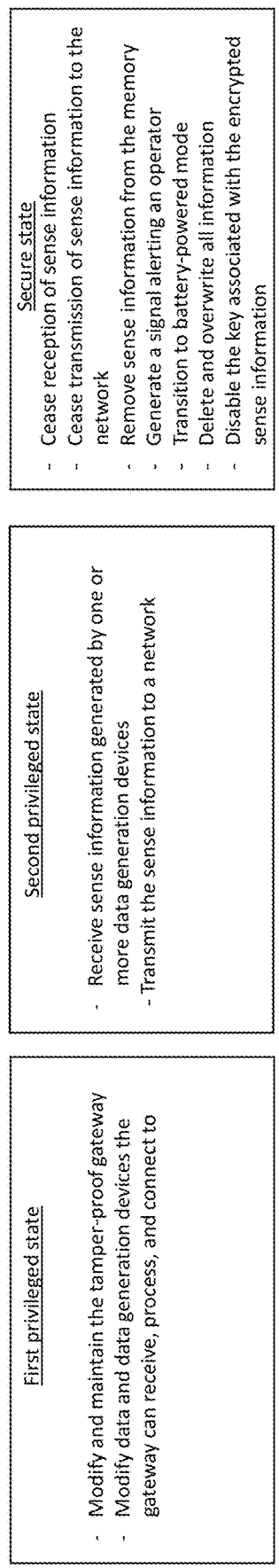

First privileged state
- Modify and maintain the tamper-proof gateway
- Modify data and data generation devices the gateway can receive, process, and connect to

Second privileged state
- Receive sense information generated by one or more data generation devices
- Transmit the sense information to a network

Secure state
- Cease reception of sense information
- Cease transmission of sense information to the network
- Remove sense information from the memory
- Generate a signal alerting an operator
- Transition to battery-powered mode
- Delete and overwrite all information
- Disable the key associated with the encrypted sense information

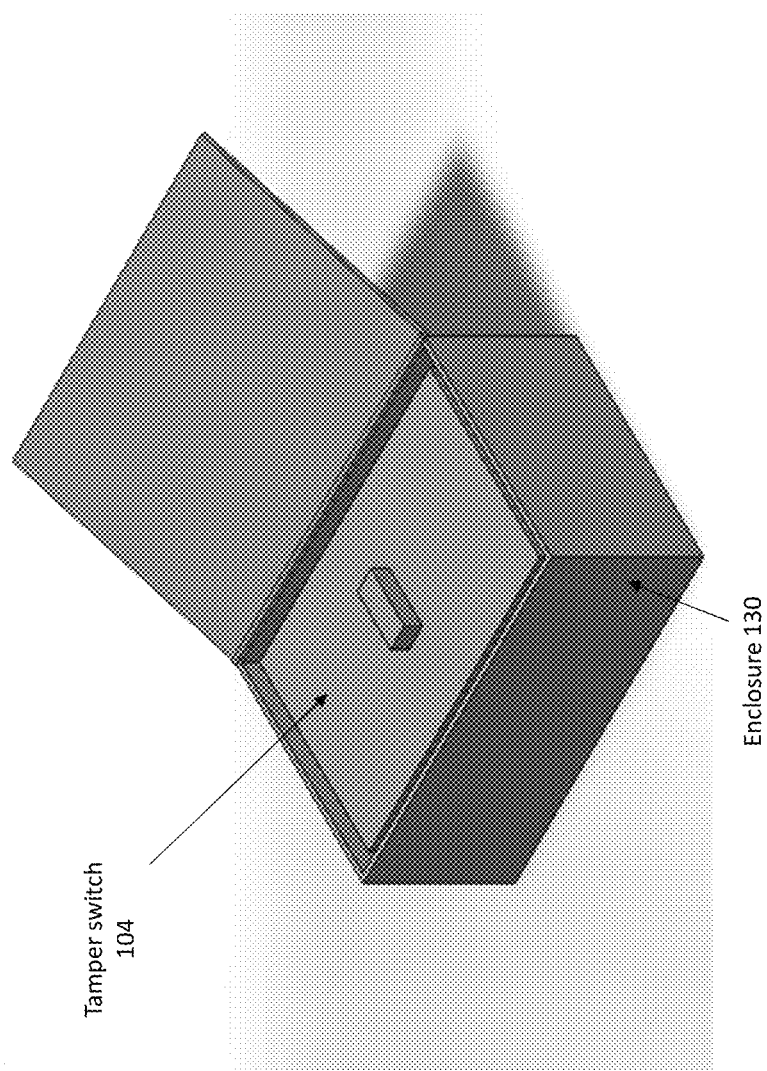

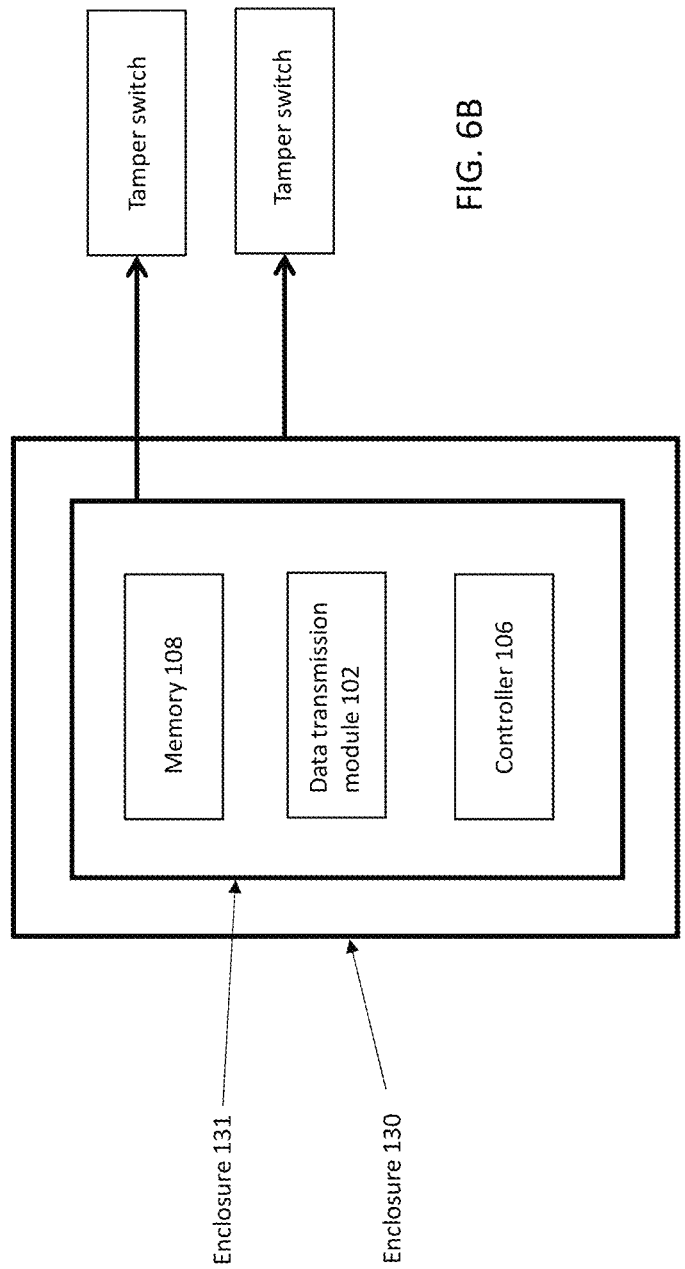

SECURE TAMPER RESISTANT DATA PROCESSING, STORAGE, AND TRANSMISSION GATEWAY AND CONTROLLER AND DATA ANOMALY DETECTION PROGRAM

RELATED APPLICATIONS

This application claims the benefit under 35 U.S.C. § 119(e) of U.S. Provisional Patent Application Ser. No. 63/248,352, entitled "SECURE TAMPER RESISTANT DATA PROCESSING, STORAGE, AND TRANSMISSION GATEWAY AND CONTROLLER AND DATA ANOMALY DETECTION PROGRAM," filed on Sep. 24, 2021, which is hereby incorporated herein by reference in its entirety.

BACKGROUND

Smart meters are electronic devices that acquire various types of information, such as electricity consumption, natural gas consumption, water, current and voltage levels, and temperature. Smart meters typically record information in real time or near real-time. Smart meters with a display can provide up-to-date information on gas and electricity consumption, thereby helping people to manage their energy usage and reduce their energy bills.

SUMMARY

Some embodiments relate to a tamper-proof gateway, comprising: a data intake module configured to be coupled to one or more data generation devices; a data transmission module configured to transmit data to a network, the data being derived from sense information generated by the one or more data generation devices; a tamper switch configured to generate an alert signal in response to sensing tampering of the tamper-proof gateway; and a controller coupled to the tamper switch and the data transmission module. The controller is configured to: place the tamper-proof gateway in a secure state in response to receiving the alert signal from the tamper switch, and withdraw the tamper-proof gateway from the secure state in response to receiving authentication information.

In some embodiments, upon placing the tamper-proof gateway in the secure state, the controller controls the data transmission module to cease transmission of the data to the network.

In some embodiments, upon placing the tamper-proof gateway in the secure state, the controller generates a signal alerting an operator or device.

In some embodiments, the gateway further comprises a memory configured to store the sense information generated by the one or more data generation devices, wherein: upon placing the tamper-proof gateway in the secure state, the controller removes the sense information from the memory, access to the sense information from memory, or encrypts the sense information.

In some embodiments, the controller is configured to withdraw the tamper-proof gateway from the secure state in response to receiving both remote authentication information and local authentication information.

In some embodiments, receiving remote authentication information comprises receiving authentication information from the network.

In some embodiments, the gateway further comprises an input/output (I/O) interface, wherein receiving local authentication information comprises receiving authentication information through the I/O interface.

In some embodiments, withdrawing the tamper-proof gateway from the secure state comprises placing the tamper-proof gateway in a first privileged state or a second privileged state depending on whether the authentication information is of a first type or a second type, wherein the first privileged state and the second privileged state have different levels of privilege.

In some embodiments, the second privileged state provides authorization to transmit the data to the network.

In some embodiments, the first privileged state provides authorization to perform: maintenance on the tamper-proof gateway; modify configuration of the gateway; and/or modify types of data and devices the gateway can interface with.

In some embodiments, the tamper switch comprises an accelerometer configured to generate the alert signal in response to sensing motion of the tamper-proof gateway.

In some embodiments, the tamper switch comprises an impedance sensor configured to generate the alert signal in response to sensing a variation in impedance.

In some embodiments, the data transmission module is configured to encrypt the sense information generated by the one or more data generation devices and to transmit the encrypted sense information to the network.

In some embodiments, upon placing the tamper-proof gateway in the secure state, the controller disables a key associated with the encrypted sense information.

In some embodiments, the one or more data generation devices comprise a water usage sensor.

In some embodiments, the gateway further comprises an enclosure, wherein the data transmission module is disposed in the enclosure, wherein the tamper switch is configured to generate the alert signal in response to sensing tampering of the enclosure.

In some embodiments, the enclosure is water resistant.

In some embodiments, the enclosure is a first enclosure, the tamper switch is a first tamper switch and the alert signal is a first alert signal, wherein the tamper-proof gateway further comprises a second enclosure and a second tamper switch, and wherein the first enclosure encloses the second enclosure, and the second tamper switch is configured to generate a second alert signal in response to sensing tampering of the second enclosure.

In some embodiments, the data transmission module comprises an antenna and a satellite communication module coupled to the antenna, and wherein the controller is configured to determine a location of the tamper-proof gateway using the satellite communication module.

Some embodiments relate to a method of operating a tamper-proof gateway, comprising: receiving sense information generated by one or more data generation devices; transmitting, to a network and using a data transmission module disposed in the tamper-proof gateway, data derived from the sense information generated by the one or more data generation devices; generating, using a tamper switch, an alert signal in response to sensing tampering of the tamper-proof gateway; placing the tamper-proof gateway in a secure state in response to receiving the alert signal from the tamper switch; and withdrawing the tamper-proof gateway from the secure state in response to receiving authentication information.

In some embodiments, placing the tamper-proof gateway in the secure state comprises controlling the data transmission module to cease transmission of the data to the network.

In some embodiments, withdrawing the tamper-proof gateway from the secure state is performed in response to receiving both remote authentication information and local authentication information.

In some embodiments, receiving remote authentication information comprises receiving authentication information from the network.

In some embodiments, receiving local authentication information comprises receiving authentication information through an input-output (I/O) interface of the tamper-proof gateway.

In some embodiments, withdrawing the tamper-proof gateway from the secure state comprises placing the tamper-proof gateway in a first privileged state or a second privileged state depending on whether the authentication information is of a first type or a second type, wherein the first privileged state and the second privileged state have different levels of privilege.

In some embodiments, the method further comprises encrypting the sense information generated by the one or more data generation devices and transmitting the encrypted sense information to the network.

In some embodiments, placing the tamper-proof gateway in the secure state comprises disabling a key associated with the encrypted sense information.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in the figures in which they appear.

FIG. 3 is a flowchart illustrating a method for operating a tamper-proof gateway, in accordance with some embodiments.

FIGS. 4A-4C are block diagrams illustrating multiple operational states associated with a tamper-proof gateway, in accordance with some embodiments.

FIG. 6A is a schematic diagram illustrating an enclosure that may house the tamper-proof gateway of FIG. 1, in accordance with some embodiments.

FIG. 6B is a block diagram illustrating a multi-layer enclosure system housing the tamper-proof gateway of FIG. 1, in accordance with some embodiments.

DETAIL DESCRIPTION

Figure 1:
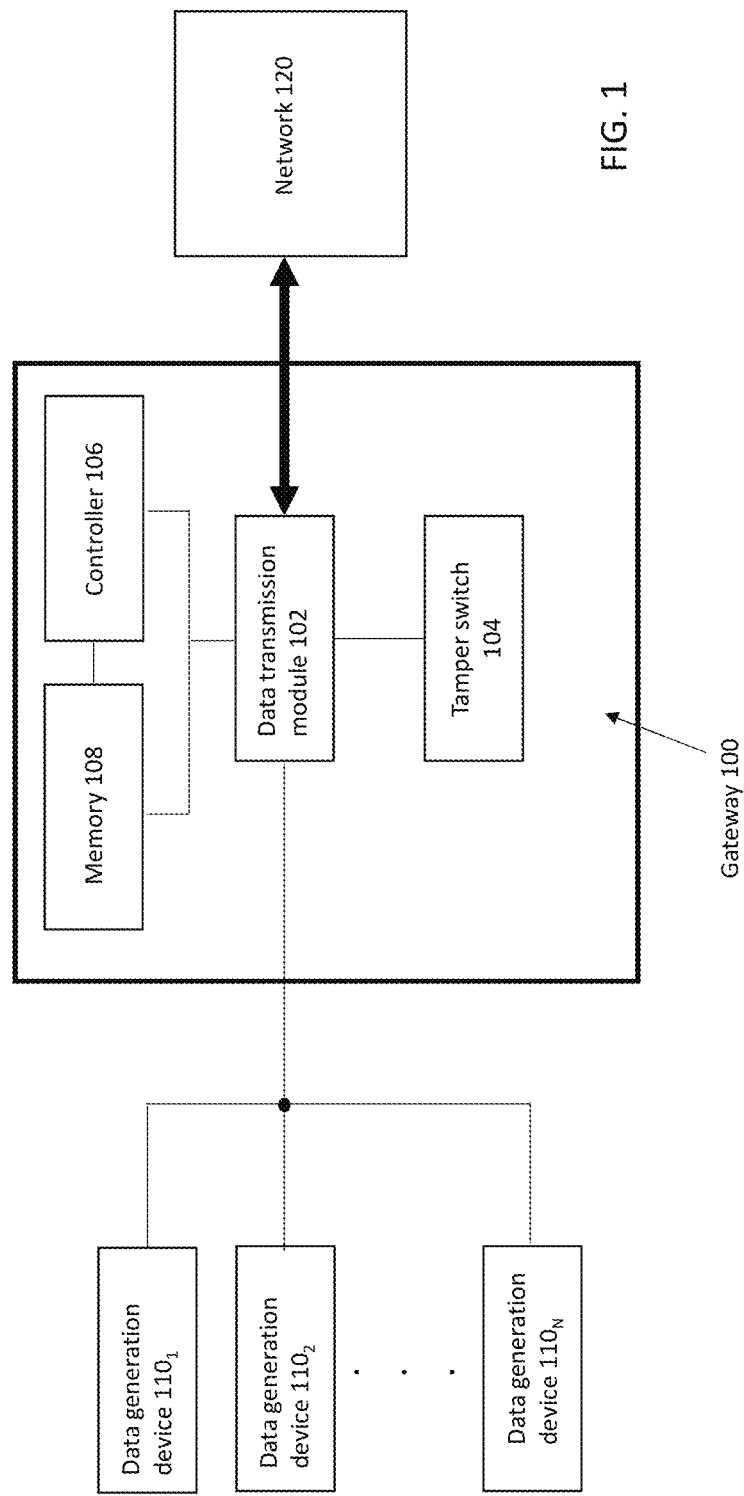
FIG. 1 is a block diagram illustrating a tamper-proof gateway configured to transmit information to a network, in accordance with some embodiments.

The present disclosure relates generally to gateways that can be used in the field to securely bring devices online, allow devices to communicate with one another, act as a controller, store data, and to process data. A data anomaly detection program can be used in any industry where identifying and removing outliers as well as spotting for manipulated or faulty data on the data input side is of importance as well as identifying if a data output, storage, or processing source has been tampered with. The present disclosure can be used in any industry where ensuring the security of data is a key consideration. Example industries where this can be used include manufacturing and processing facilities, factories, data centers, offices, warehouses, shops, supply chain, transportation, home security, financial sector, government, defense, etc.

The inventors have recognized and appreciated that bringing devices online provides many advantages, including more real-time decision making and alerting, information tracking and aggregation, reducing labor of manual data collection, enabling more proactive operations, and increased efficiency. However, one of the largest concerns with bringing devices, sensors, and controls online is any security breaches: the possibility of attackers listening into or manipulating the data collected by these devices, compromising the integrity of the data collection process from these devices, as well as hijacking these devices to deny service or cause damage.

This is a major concern preventing devices from being connected online. This particularly is relevant in industries where security of data and data transmission is of extreme importance. One example is monitoring of critical and proprietary processes such as ingredient mixes within a food and beverage processing plant. Monitoring input ingredients and real-time product creation is highly important for continuous product and material quality control, informing downstream production process parameters. Currently, facility operators oftentimes must obtain grab samples of raw material ingredients and downstream products, conducting lab tests on these samples. Alternatively, if data generation devices exist, they often must visit the sensor and meters to record the current sensor reading. This oftentimes causes reactive production processes, fluctuations and inconsistencies in quality of the product, greater wasted product batches, and production inefficiency. Obtaining real-time quality data of ingredients and product at various stages of the production process in a touchless manner allows for dynamic and optimized production, as well as reduced resource and operating cost. However, ingredient and product formulation are often critical proprietary trade secrets of the customer. In order for real-time quality control to occur, data collection and transmission must be conducted in a high-secure manner. Other relevant industries include high secure environments where operations reliability is important and can be targets for attacks. These include facilities related to the defense sector, sectors of high national or commercial interest, data centers, hospitals, warehouses, supply chains, utilities, machines, vehicles, equipment, etc. One example is the monitoring of water usage and quality for industrial cooling systems. Cooling of objects and/or processes including machines, equipment, materials, servers, and rooms is a key process for the operation of an industrial facility. The amount of water pumped into circulation to remove heat and the quality of water which affects the buildup of scale in piping systems are key measurements for effective cooling in industrial facilities. Currently, this data is often collected by a field technician when visiting the meters and sensors monitoring this type of data on the field, or collecting grab samples of the liquid to be sent for a lab test to be conducted. These snapshot data points result in a delayed and reactive method of managing water usage and quality. Connecting these sensors and meters online will allow facility operators to monitor and manage the water and cooling of the facility in real time as well as have an easily accessible copy of the data that they can analyze, reference, and report upon. However, for this to occur, the transmission of data from these sensors and meters collecting water data should occur in a secure format. Other devices monitoring and managing key processes that will see benefits from being connected online include those related to product processing or manufacturing in factories, sanitation, wastewater treatment, heating and cooling, building HVAC systems, residential and commercial building water and utility meters, power and electricity monitoring, etc.

Gateways that store and transmit data of these processes online to a server should be secure, durable, and able to operate continuously. Further, these devices should be easy to operate, leave-and-forget devices that require low maintenance. Even devices that are not connected to an open network, those that only transmit, store data, and/or send commands to devices in a local network, can leak sensitive information or send and store malicious information after being tampered with physically by an attacker. Additionally, attackers can also compromise the data collection sources (e.g., sensors) that are sending data to these devices to create faulty data inputs. The inventors have recognized and appreciated the importance of developing a cost effective, durable, weather resistant, tamper resistant, and secure data storage, processing, and transmission gateway. The inventors have further recognized and appreciated the importance of identifying tampered and abnormal data in order to provide communication in a trustworthy manner.

There are transmission gateways on the market and used today that connect devices online and send data to the cloud. However, some of these devices do not meet the security requirements of many use cases, especially against physical tampering. An attacker can open up the encasing and pull data from the device or manipulate the data coming into the device. They are additionally not weather and waterproof. There are additional products that can send data to the cloud. However, these gateways limit users to work with only their software or cloud provider and do not allow the customer to customize where data is sent to. Additionally, if an attacker gains physical access to the device, they do not have the physical tamper proof features to prevent data manipulation or breach. There are also programmable logic controllers. However, again, they can be physically tampered to have its data be breached and have compromised data be imputed into it. Additionally, these devices do not on themselves have software integrated with it to detect outliers, tampering, irregular data types, irregular send rates, etc. that can be signals for a possible attack or failure.

Recognizing the limitations of current products, the inventors have developed gateways, software, and methods designed to reliably and securely transmit, store and process data while being tamper proof and able to defend against physical and remote attacks. In some embodiments, this can involve the integration of locks, tamper proof stickers, tamper resistant screws, tamper switches, baffling, enclosure material, tamper identification software programs, alert systems, and/or encrypted data storage devices, among other techniques.

Some embodiments enable two-layer access control on the device with required authentication to reduce risk of internal attack. Some of these devices are designed to be weather resistant, water resistant, resilient to harsh climates and temperatures, and/or to be able to be deployed in hazardous environments. These devices are further designed to keep manufacturing costs low, and to be easy to set up and plug-and-play while requiring low maintenance. Some embodiments allow the device to securely communicate with other devices wired or wirelessly through encrypted data packets. Further, in some embodiments, the data is interpreted and processed in formats that are common in industrial environments such as OPC UA, modbus, 4-20 mA, HART, digital, i2c, spi, etc.

Further, some embodiments involve integration of a secure gateway with software to identify for, alert, and mitigate against outliers in data types, data values, and irregular data send rates, etc. As an example, software may automatically disconnect, alert, and block the connection of a gateway or controller to an endpoint server if data from the gateway is flooded (e.g., sent at an abnormally high rate) to the endpoint, which attackers often perform to eat up data or deny service for the user.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

FIG. 1 is a block diagram illustrating a tamper-proof gateway 100, in accordance with some embodiments. Gateway 100 includes a data transmission module 102, a tamper switch 104, a controller 106 and a memory 108. Gateway 100 receives sense information transmitted by one or more data generation devices ($110_1$, $110_2$ ... $110_N$) coupled to the gateway. Data generation devices of the types described herein are any device or system that creates or contains signals or data. These may include, for example, sensors and/or system controllers of various types. In one example, a data generation device includes a water usage sensor or meter configured to measure the volume of water used for cooling of objects and/or processes including servers, machines, equipment, materials, buildings, rooms, for example. These types of sensors allow operators to determine the amount of water pumped into circulation to remove heat for effective cooling in industrial cooling systems in manufacturing environments, buildings, or machines. In another example, a data generation device includes a sensor configured to identify the presence (and optionally, the concentration) of chemicals and other materials present in water or other fluids. These types of sensors allow operators to determine the quality of the water. Low-quality water may affect the buildup of scale in the piping system of industrial cooling systems in manufacturing environments, buildings, and machines. As yet another example, a data generation device includes a sensor configured to measure the pH of water or other fluids. As yet another example, a data generation device includes a sensor configured to measure the temperature of a server or other electronic equipment. As yet another example, a data generation device includes a sensor configured to measure the electric power used by a server or other electronic equipment. In these examples, the sense information transmitted by the data generation device(s) to gateway 100 includes data representing the measured quantity. Additionally, or alternatively, a data generation device may include a system controller. As one example, a data generation device may include a device that is configured to control the amount of water to be pumped into circulation to remove heat. In these embodiments, the sense information may include data indicative of the amount of pumped water, the state information on what times the water is being pumped, as well is signals that are to be passed to inform or control another device (ex. a device that lets water out of circulation, a device that treats the water, etc.). As another example, a data generation device may include a device that is configured to control the types of chemicals (and/or the amount of chemicals) to be released into water or other fluids. In these embodiments, the sense information may include data indicative of the type and/or amount of released chemicals. As another example, a data generation device may include a device that is configured to turn a shut-off valve on and off, for example to pump or block water for cooling purposes. In these embodiments, the sense information may include data indicative of the time intervals in which the shut-off valve was turned on and the time intervals in which the shut-off valve was turned off. These data generation devices are also not limited to the realm related to water or fluids. In another example, a data generation device may include a device that detects tampering (such as a tamper switch) to detect unauthenticated tampering of the gateway or other devices. In this example, the sense information can be the state of the device and data generated by the device. As a further example, a data generation device may include a power meter detecting energy use in a facility or subsection of infrastructure, tracking power usage. For another example, a data generation device may include a clock or time tracker such as a real time clock. As an additional example, a data generation device may include a sensor measuring a quality parameter of a sample (e.g., chlorine, pH, dissolved oxygen) to inform best understanding of chemical dosing to optimize sanitation or treatment. A data generation device can also be a data storage device that the gateway can retrieve data from and the sense information is the data in the data storage device. An example is a database or historian where sensor or control data is stored. Data from this database can be pulled from, transmitted, or pushed to the gateway from a device or server. Sense information can also be data regarding settings, setpoints, or configurations of a system. Sense information can also be commands or controls. The data generation devices may transmit data derived from sense information to the gateway in a wired or wireless fashion, according to any suitable communication protocol.

Data transmission module 102 transmits data derived from the sense information obtained from the data generation module(s) to a network 120. The data transmitted to the network can include the sense information itself and/or data indicative of the sense information (e.g., a processed version of the sense information or values that describe a certain characteristic of the sense information) and/or data from a data generation device, commands, a state or status info and/or a computed value from a model and/or algorithm that takes in the data. An example includes a pH meter that measures the pH level of a fluid connected to the gateway along with a database or controller with information representing the pH level that the fluid should be at. The gateway can determine the current level of pH and whether it is above or below the supposed pH level that is set on the controller or database connected to it. It can then compute an output to the network or back to a pH adjustment device connected to it to add more acid, base, or neutralizer in the fluid. In some embodiments, the data can include a more complex model that takes in multiple data sources and computes an output that gets passed or executed.

The data may be transmitted in real-time (e.g., without buffering or pre-processing), or upon buffering and/or pre-processing. For example, controller 106 may store, filter and down-sample the sense information prior to transmission to network 120. The controller can also have an algorithm or model that processes and computes an output from the data that gets transmitted to network 120. Network 120 includes a computer network arranged in any suitable architecture, including for example servers that support a cloud network or a local network of computers or devices not connected to the internet. Network 120 may include a single computer or multiple computers. The gateway 100 can also form a network that connects the data generation devices. In some embodiments, the network 120 may also be interchangeable with the data generation devices 110. Data can be retrieved or passed from network 120 or data generation devices 110 to the gateway, data can be transmitted from the gateway 100 to the network 120 or can be passed to data generation devices 110. One data generation device (e.g., 100$_1$) can send data or commands to the gateway that can be transmitted to or retrieved from another data generation device (e.g., 100$_2$) through the gateway. Alternatively, data or commands can be passed or retrieved from the network 120 to the gateway that then transmits the data or commands to the data generation devices connected to it. Furthermore, data or commands can be processed in the gateway controller 106 before being transmitted. These different embodiments are possible but not all required for the gateway to function.

Communication between the network and the data transmission module may be wireless (with an antenna) or wired. In some embodiments, the data transmission module may include a satellite communication module. The gateway may use the satellite communication module to determine its location and/or to communicate with the network notwithstanding spotty internet/intranet/network service. This allows gateways to be deployed in remote locations where network access is limited or even unavailable. Further, location information may be provided to the user so that the user may locate the gateway even if transported elsewhere by an attacker.

Tamper switch 104 is configured to sense tampering (e.g., modifying, updating, maintaining, accessing, editing, entering, reconfiguring, hijacking, compromising, damaging, breaking through, redirecting, confusing, deceiving, disabling, interfering, denying service, emulating, listening, rebooting, booting up, observing, copying, spamming, opening, changing the power source) of gateway 100. Tampering may be aimed at blocking, intercepting, and/or manipulating the sense information to be transmitted by the gateway to the network. The inventors have recognized and appreciated that tampering may occur in a variety of ways. In one example, tampering may involve an attempt to physically open the enclosure housing the gateway, for example to get access to memory 108 or controller 106. In another example, tampering may involve manipulating a data generation device (e.g., by reprogramming the data generation device or by replacing the data generation device with another device) to generate inaccurate data or to flood the gateway with data at very high rates. In another example, tampering may involve connecting a USB drive to the gateway in an attempt to download previously-stored sense, network, or device information. In another example, tampering may involve adding, removing, retrieving, or modifying software, code, or configuration settings on the gateway. In another example, tampering may be physically relocating the gateway to another location. Another example of tampering may be adding, changing, or removing hardware or electronics of the gateway. Another example of tampering may be interfering with the transmission of data between the data generation device to the gateway or between the gateway and the network. This interference can be disconnecting or changing wired connections or communications or a signal emission or manipulation system that interferes with wireless communications. In another example, tampering may include removing external power from the device, either to enable its removal from designated location, or to deny its use to the intended client. In another example, tampering may include emissions of electromechanical signals to interfere with signals from or in the gateway or interfere with the operations and stability of the electronics or components in the gateway. In another example, tampering may include sniffing to obtain unauthorized access to the transmitted data.

Tamper switch 104 may include hardware and/or software configured to generate an alert signal that can be transmitted, stored, or initiate another action in response to sensing tampering of gateway 100. In some embodiments a tamper switch is a physical trigger that gets activated when an enclosure is moved. In other embodiments a tamper switch is a motion sensor to sense the presence of a foreign object or material entering into an enclosure the gateway is in. In some embodiments, a tamper switch 104 includes an accelerometer that senses unexpected motion of the gateway 100. In response to sensing motion, the accelerometer generates an alert signal. In some embodiments, a tamper switch can be a location sensor or tracker that triggers when it identifies that it is in a new location. Additionally, or alternatively, a tamper switch may detect attempts to physically breach a gateway. For example, a gateway may be housed in an enclosure containing baffling made out of metal to prevent attackers from easily cutting or drilling into the enclosure. Furthermore, a wired baffling circuit can be implemented as or on an enclosure around the device where the resistance of the wire is measured. The wired baffling may wrap around the secured device, where the wire trace may form a maze-like structure. Cutting one portion of the trace may sever the entire connection. If the wire is cut or disconnected, the tamper switch may become open and trigger programmable tamper measures. If a wire in the baffle is cut and resoldered elsewhere, the resistance of the wires may change, indicating an intrusion and causing the device to run a programmable action. Thus, a tamper switch may include an impedance sensor configured to sense variations in the impedance of a wire. This may be done using dedicated hardware or via software.

In another example, a tamper switch includes a device configured to detect anomalies in the sense information received from a data generation device. For example, the tamper switch may detect whether a characteristic of the sense information has changed unexpectedly, including whether the data rate and/or the nature of the data has changed. The tamper switch may log time and may note that the data generation/collection has been altered. It may further note the type (and optionally the ID) of the data generation device that was previously connected to the gateway as well as the type (and optionally the ID) of the data generation device currently connected to the gateway. In other examples, a data generation device can be a tamper switch. An example can be a data generation device connected to the gateway for security purposes such as a security camera or motion sensor which spots for presence of personnel without privilege in a location. Another example can be a tamper system of a data generation system connected to the gateway that gets triggered. If an attacker attempts to alter the settings and configuration of the gateway without the proper credentials, the tamper switch may record the time and type of the attack. In another example, a tamper switch includes a program that identifies when files, software, or settings on the gateway are read or accessed, when they are modified, deleted, or new software is added. In another example, a tamper switch includes a measurement of peripherals, operations, and process output against expected values. If an attacker attempts to modify the method in which a process is performed, the tamper switch may identify and record the discrepancy. In another example, a tamper switch can be a hidden program or script that identifies when programs run on the gateway are hung, stopped, or killed. In another example, a tamper switch includes an authentication system that gets triggered when an unauthenticated user attempts to access or modify the software or hardware of the gateway. In another example, a tamper switch includes an authentication system that gets triggered when a user that does not have the correct authentication inputs the wrong authentication or a user with denied access inputs their authentication into the system. The tamper switch can track the trigger as well as the frequency and number of triggers to initiate an action or alert. In another example, a tamper switch could be a tracker or watchdog that tracks the operation of components in the gateway, data generation devices, and other tamper switches that is more resilient to electromagnetic interference and attacks and is triggered when one of the components, devices, or switches become unresponsive, observe abnormal behavior, is no longer operational, or under electromagnetic interference or tampering. This switch can also have the ability to reactivate, boot up, or switch the device into a backup state if electromagnetic interference or tampering is identified. After triggering of a tamper switch or multiple tamper switches, different actions can be executed and states that the gateway, data generation devices, or network can be entered into depending on the type, combination, and behavior (frequency) of the triggered tamper switch or switches. After triggering the tamper switch, the type, location, data, and/or level of the switch can be recorded to determine the severity and/or type of attack. Tamper switches triggered for typical user servicing (e.g., bootup of device) can be differentiated from attacks against internal non-user-serviceable hardware. Additionally, pressure, airflow, mesh connection, and brightness tamper switches when added in combination will increase attack difficulty by increasing the monitoring of the symptoms of an attack.

Memory 108 can store sense information. In some embodiments, memory 108 can be AES 256 or stronger encrypted with secure boot functionality. The data storage module can have a read only boot partition that cannot be edited. The second root file system partition containing the operating system and operation programs may only be accessed after successful authentication. This partition can be set to read and write or read only. Other methods of data storage can also be implemented such as an on-board drive, a portable drive (e.g., USB), a regular SD card, etc. A metal encasing can also be placed around these data storage devices to prevent an attacker from cutting into the enclosure and removing the data storage device.

Figure 2:
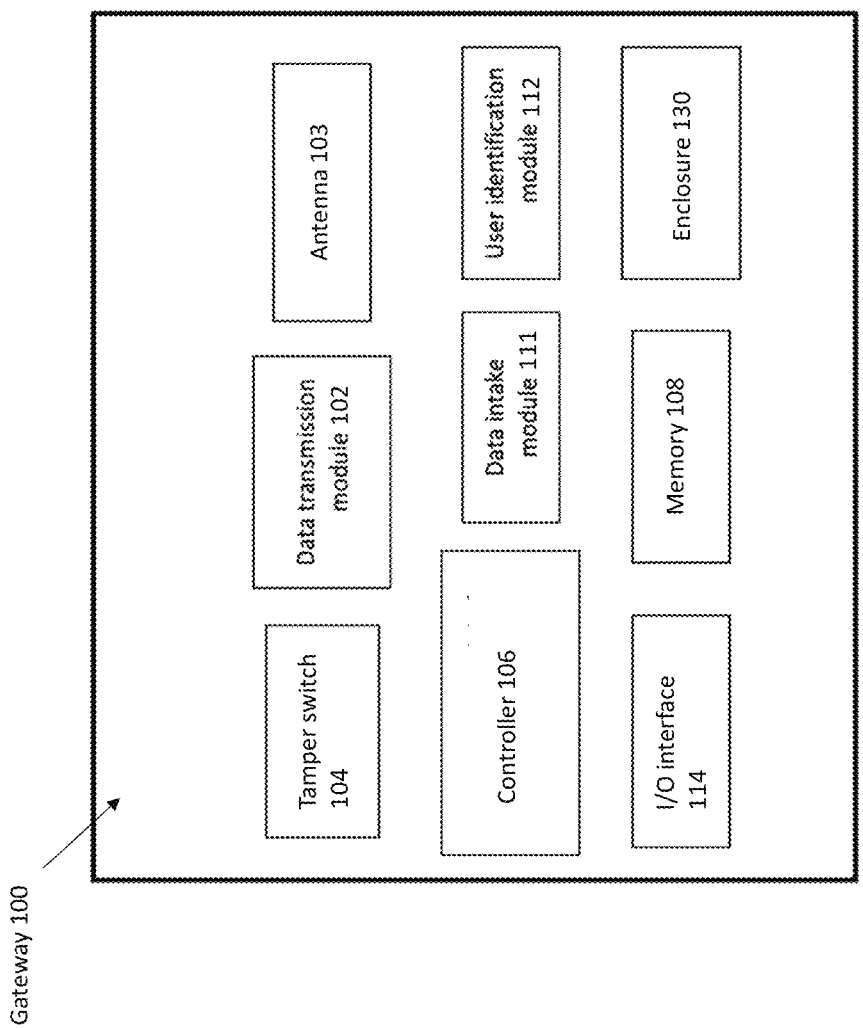
FIG. 2 is a block diagram illustrating additional modules that may be part of the tamper-proof gateway of FIG. 1, in accordance with some embodiments.

FIG. 2 is a block diagram illustrating additional modules that may be part of gateway 100 in some embodiments. Antenna 103 is coupled to data transmission module 102 and supports wireless communication. Data intake module 111 interfaces with the data generation device(s). For example, data intake module 111 may include conductive terminals passing through the enclosure housing the gateway. Data intake module 111 can also connect to an antenna to receive data from data generation devices wirelessly. User identification module 112 may be used to perform user authorization and identification, as described in detail below. Input/output (I/O) interface 114 may include any interface enabling interaction between a user and the gateway, including buttons, a keyboard, a mouse, a touch screen, a USB interface, a microphone coupled with voice recognition software, biometric input, a fingerprint scanner, speakers, etc. Enclosure 130 houses the gateway, as described in detail further below.

FIG. 3 is a flowchart illustrating a method of operating a gateway, in accordance with some embodiments. Method 300 may be performed using any suitable gateway, as aspects of the present application are not limited to any particular implementation. As one example, gateway 100 (see FIG. 1) may be used to perform method 300. For example, controller 106 may be programmed with software that, when executed, performs the steps described in connection with FIG. 3. Alternatively, a virtual gateway may be used to perform method 300. A virtual gateway may be for example a controller, computer, or server programmed to emulate a physical gateway. It should be noted that the steps described below need not be performed in the sequence illustrated in FIG. 3, as other sequences are also possible.

At step 302, a gateway receives sense information generated by one or more data generation devices. Examples of data generation devices and corresponding sense information have been provided above. Step 302 may be performed using data intake module 111 of FIG. 2.

At step 304, the gateway transmits data derived from the sense information to a network. The network may be open or local. The data may be transmitted in real time (e.g., without buffering or pre-processing) or otherwise, either via wireless or wired means. Step 304 may be performed using data transmission module 102 of FIG. 1.

At step 306, the gateway generates an alert signal in response to sensing tampering of the gateway. Examples of the types of tampering to which a gateway may be subject have been described above. Step 306 may be performed using tamper switch 104 of FIG. 1.

At step 308, the gateway is placed in a secure state in response to receiving the alert signal generated at step 306. The type of secure state can be different depending on the type of tamper switch, frequency, and combination of tamper switches triggered. Lastly, at step 310, the gateway is withdrawn from the secure state in response to receiving authentication information. Withdrawing the gateway from the secure state may involve placing the gateway in a first privileged state or a second privileged state, depending on how the gateway is re-authenticated. Steps 308-310 may be performed using controller 106 of FIG. 1.

Operations that can be performed in the first privileged state, second privileged state and secure state are described below in connection with FIGS. 4A, 4B and 4C, respectively. Different configurations of the states can be possible, different levels of privileges can be possible, and different amounts of operational states can also be possible. Different capabilities and access can be different for different privilege states. For example, a first privilege state can be for a technician for maintenance and allows access or capability to modify the configuration/settings of the gateway that informs the gateway what data generation devices are connected to it or what data is sent or can be retrieved by the gateway. This can allow the technician to add, remove, or modify the data generation devices that interface or connect with the gateway. For example, a second privilege state can be for an operator and allows capability to only boot up the gateway. This enables the gateway to receive data or sense information from one or more data generation devices and to transmit the data or sense information to a network (e.g., as discussed in connection with steps 302 and 304). In the second privileged state, the gateway does not allow the access and/or modification of the configuration/settings of the gateway that informs the gateway what data generation devices are connected to it or what data is sent or can be retrieved by the gateway. This prevents the ability to add, remove, or modify the data generation devices that interface or connect with the gateway. In this example, the first privilege state also has the capability of the second privilege state of booting up the gateway. However, in another example, the first privilege state cannot have the capabilities of the second privilege state or can only have a subset of the capabilities of the second privilege state. There can be multiple privilege states with single, multiple capabilities, or a combination of capabilities available in each privilege state. The capability of one state can be not available for another state. Examples of capabilities include getting data from certain data generation devices, running certain operations on the gateway, activating certain features of the gateway, reading or modifying certain files or sections of the gateway, accessing certain parts of memory 108, modifying the gateway, and modifying characteristics and behavior of the gateway. The capabilities of each of the states can be exclusive, only available when in that specific state or inclusive of another privileged state (e.g., capabilities of the second privileged state is also available in the first privileged state). Whether a gateway is placed in the specific state (e.g., a first privileged state or a second privileged state) may depend on how a user is authenticated. For example, an operator may have a special key that, when entered, places the gateway in the second privileged state. A technician can have another different key that places the gateway into a first privileged state. Being in a first privileged state may also require the key of the operator that sets the device into a second privileged state as well as the technician's key to enter into the first privileged state. Alternatively, the gateway may be placed in the second privileged state when locally authenticated and may be placed in the first privileged state when remotely authenticated or vice versa, or placed in a first privileged state when both locally authenticated and remotely authenticated. How authentication is done can vary. They can be a physical method like a biometric feature, unique card or key, or a code, certificate, or password, or with any unique user identifiable feature.

The secure state may not provide the authorization to transmit sense information to a network or even to receive sense information from the data generation device(s), nor to perform maintenance on the gateway. In this state, to prevent attackers from blocking, intercepting, and/or manipulating the sense information, any combination of the following actions may be taken: 1) cease reception of sense information (e.g., by decoupling the data intake module from the data generation device(s), 2) cease transmission of the sense information, 3) remove sense previously-stored information from the memory of the gateway (e.g., memory 108), 4) generate a signal alerting an operator, connected devices, or the network that an attack is underway or has occurred, 5) transition from a grid-powered mode to a battery-powered mode (thereby protecting the gateway from attempts to compromise its power source), 6) delete and overwrite all information, and 7) disable a key associated with encrypted sense information. In some embodiments, data transmission module 102 encrypts the sense information to be transmitted to the network and then transmits the encrypted sense information. A key may then be used, in the network, to decrypt the sense information. In some embodiments, in the secure state, the key is disabled. As a result, the encrypted information may not be decrypted.

It should be noted that while FIGS. 4A-4C depict three levels of privileges, additional levels are also possible. Privileges to perform certain operations may be provided incrementally as additional authentication information is provided.

Figure 5:
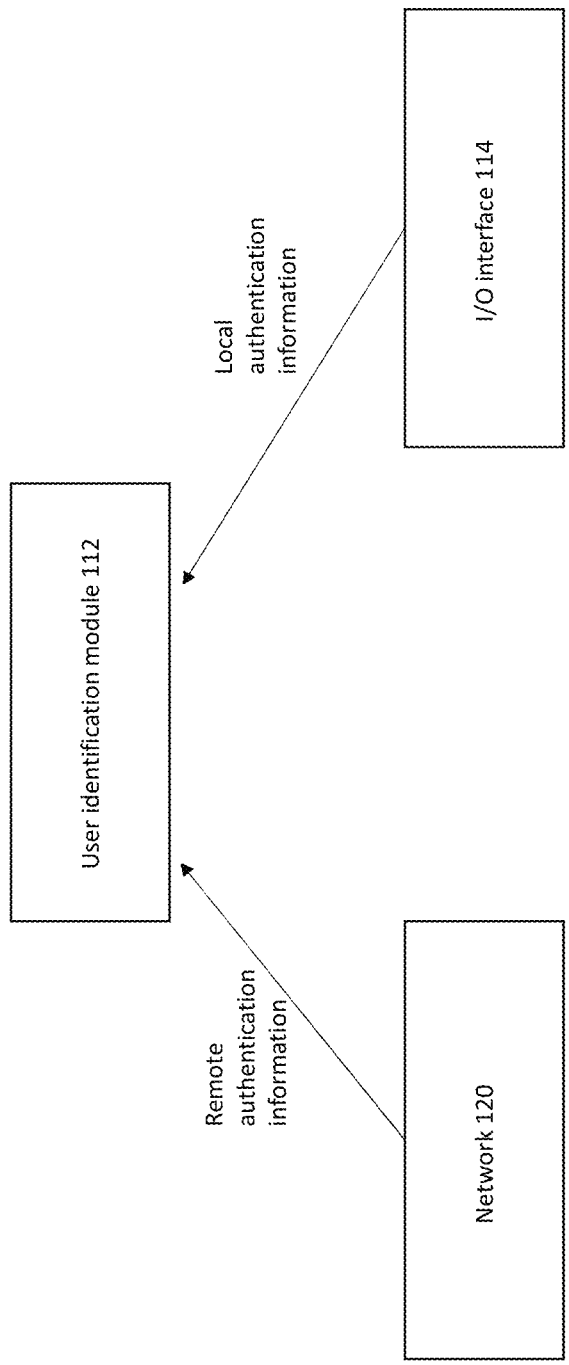
FIG. 5 is a block diagram illustrating different types of authentication information, in accordance with some embodiments.

As described above, a gateway is withdrawn from the secure state in response to receiving authentication information. Local authentication, remote authentication, or both may be required to withdraw a gateway from the secure state, as illustrated in connection with FIG. 5. Local authentication may involve authentication performed using I/O interface 114, for example. On the other hand, remote authentication may involve authentication received from network 120 (e.g., through data transmission module 102). There can also be multiple types of local and remote authentication mechanisms where one, a combination, or all must be passed to enter a specific non secure state for the gateway. In some embodiments, requiring that both types of remote and local authentication be performed may further increase the security of the gateway.

In some embodiments, a gateway may be placed in a first privileged state or a second privileged state, as described above, depending on the type of received authentication information. For example, receiving local authentication information may lead to the second privileged state whereas receiving remote authentication information may lead to the first privileged state. Alternatively, receiving remote authentication information may lead to the second privileged state whereas receiving local authentication information may lead to the first privileged state. Alternatively, receiving only one type of authentication information (either local or remote) may lead to the second privileged state whereas receiving both types of authentication information may lead to the first privileged state. There may be additional authentication measures that correlate to different types of privilege.

The inventors have recognized and appreciated that preventing loss of data integrity is critical. In system controllers of the types described above (e.g., for operations such as production lines), decisions need to be made on the millisecond to seconds level as loss of data or faulty data can cost thousands to hundreds of thousands of dollars per minute. In these deployment environments, issues such as power surges, irregular voltage, power outages, temperature swings, high humidity, high vibrations, network failures, weathering can negatively affect the integrity of the sense information collected to a gateway. Recognizing the need for rugged, reliable, and failsafe gateways, the inventors have developed special enclosures that enable gateways to survive harsh environments experiencing temperature swings, weathering, humidity, high vibrations, power outages, network failures, etc. One example of such an enclosure (130) is shown in FIG. 6A, in accordance with some embodiments. In this example, the enclosure includes a tamper switch that is mechanically triggered upon opening of a lid. As described above, the enclosure can contain baffling made out of metal to prevent attackers from easily cutting or drilling into the enclosure. The enclosure can be weatherproof, including IP 65, 66, 67, 68 ratings, can contain tamper resistant screws, contain a latch that can be held together with a lock, and can be bolted or screwed down onto a physical support such as concrete. In some embodiments, tamper stickers can be placed on, in, or around the enclosure, electronics, and surfaces of the device in order to allow users and owners of the device to easily identify if the device has been tampered with.

The enclosure can also contain multiple layers. These layers can be made out of various materials from ceramic, polymers, metals, composites, fiberglass, etc. In some embodiments, a tamper switch monitors the integrity of each enclosure layer, thereby increasing the overall robustness of a gateway to attacks. In the example of FIG. 6B, a first enclosure (131) houses the core electronics of gateway 100, and a second enclosure (130) encloses the first enclosure. One or more tamper switches sense tampering of each enclosure. The presence of more than one enclosure, which aspects of the gateway is being enclosed in which layer of enclosure if there is more than one, the material of each enclosure if there is more than one, the amount of enclosures if more than one, and how the layers are configured may vary.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A tamper-proof gateway, comprising:
   a data intake module, executed by at least one processor, configured to be coupled to one or more data generation devices;
   a data transmission module, executed by the at least one processor, configured to transmit data to a network, the data being derived from sense information generated by the one or more data generation devices;
   a tamper switch configured to generate an alert signal in response to sensing tampering of the tamper-proof gateway;
   an enclosure, wherein the data transmission module is disposed in the enclosure, wherein the tamper switch is configured to generate the alert signal in response to sensing tampering of the enclosure; and
   a controller, executed by the at least one processor, coupled to the tamper switch and the data transmission module, the controller configured to:
     place the tamper-proof gateway in a secure state in response to receiving the alert signal from the tamper switch, and
     withdraw the tamper-proof gateway from the secure state in response to receiving authentication information; and
   the enclosure is a first enclosure, the tamper switch is a first tamper switch and the alert signal is a first alert signal, wherein the tamper-proof gateway further comprises a second enclosure and a second tamper switch, and wherein:
   the first enclosure encloses the second enclosure, and
   the second tamper switch is configured to generate a second alert signal in response to sensing tampering of the second enclosure.

2. The tamper-proof gateway of claim 1, wherein, upon placing the tamper-proof gateway in the secure state, the controller controls the data transmission module to cease transmission of the data to the network.

3. The tamper-proof gateway of claim 1, wherein, upon placing the tamper-proof gateway in the secure state, the controller generates a signal alerting an operator or device.

4. The tamper-proof gateway of claim 1, further comprising a memory configured to store the sense information generated by the one or more data generation devices, wherein:
   upon placing the tamper-proof gateway in the secure state, the controller removes the sense information from the memory, access to the sense information from memory, or encrypts the sense information.

5. The tamper-proof gateway of claim 1, wherein the controller is configured to withdraw the tamper-proof gateway from the secure state in response to receiving both remote authentication information and local authentication information.

6. The tamper-proof gateway of claim 5, wherein receiving remote authentication information comprises receiving authentication information from the network.

7. The tamper-proof gateway of claim 5, further comprising an input/output (I/O) interface, wherein receiving local authentication information comprises receiving authentication information through the I/O interface.

8. The tamper-proof gateway of claim 1, wherein withdrawing the tamper-proof gateway from the secure state comprises placing the tamper-proof gateway in a first privileged state or a second privileged state depending on whether the authentication information is of a first type or a second type, wherein the first privileged state and the second privileged state have different levels of privilege.

9. The tamper-proof gateway of claim 8, wherein:
   the second privileged state provides authorization to transmit the data to the network.

10. The tamper-proof gateway of claim 9, wherein:
    the first privileged state provides authorization to perform:
      maintenance on the tamper-proof gateway;
      modify configuration of the gateway; and/or
      modify types of data and devices the gateway can interface with.

11. The tamper-proof gateway of claim 1, wherein the tamper switch comprises an accelerometer configured to generate the alert signal in response to sensing motion of the tamper-proof gateway.

12. The tamper-proof gateway of claim 1, wherein the tamper switch comprises an impedance sensor configured to generate the alert signal in response to sensing a variation in impedance.

13. The tamper-proof gateway of claim 1, wherein the data transmission module is configured to encrypt the sense information generated by the one or more data generation devices and to transmit the encrypted sense information to the network.

14. The tamper-proof gateway of claim 13, wherein, upon placing the tamper-proof gateway in the secure state, the controller disables a key associated with the encrypted sense information.

15. The tamper-proof gateway of claim 1, wherein the one or more data generation devices comprise a water usage sensor.

16. The tamper-proof gateway of claim 1, wherein the enclosure is water resistant.

17. The tamper-proof gateway of claim 1, wherein the data transmission module comprises an antenna and a satellite communication module coupled to the antenna, and wherein the controller is configured to determine a location of the tamper-proof gateway using the satellite communication module.

18. A method of operating a tamper-proof gateway, comprising:

receiving, by at least one processor, sense information generated by one or more data generation devices;

transmitting, by the at least one processor, to a network and using a data transmission module disposed in the tamper-proof gateway, data derived from the sense information generated by the one or more data generation devices;

generating, using a tamper switch, an alert signal in response to sensing tampering of the tamper-proof gateway wherein the tamper-proof gateway includes an enclosure with the data transmission module disposed in the enclosure, and generating the alert signal is in response to sensing tampering of the enclosure;

placing, by at least one processor, the tamper-proof gateway in a secure state in response to receiving the alert signal from the tamper switch;

withdrawing, by at least one processor, the tamper-proof gateway from the secure state in response to receiving authentication information; and wherein the enclosure is a first enclosure, the tamper switch is a first tamper switch and the alert signal is a first alert signal, and the method further comprises generating, by the at least one processor, a second alert signal in response to sensing tampering of a second enclosure enclosed by the first enclosure using a second tamper switch.

19. The method of claim 18, wherein placing the tamper-proof gateway in the secure state comprises controlling the data transmission module to cease transmission of the data to the network.

20. The method of claim 18, wherein withdrawing the tamper-proof gateway from the secure state is performed in response to receiving both remote authentication information and local authentication information.

21. The method of claim 20, wherein receiving remote authentication information comprises receiving authentication information from the network.

22. The method of claim 20, wherein receiving local authentication information comprises receiving authentication information through an input-output (I/O) interface of the tamper-proof gateway.

23. The method of claim 18, wherein withdrawing the tamper-proof gateway from the secure state comprises placing the tamper-proof gateway in a first privileged state or a second privileged state depending on whether the authentication information is of a first type or a second type, wherein the first privileged state and the second privileged state have different levels of privilege.

24. The method of claim 18, further comprising encrypting the sense information generated by the one or more data generation devices and transmitting the encrypted sense information to the network.

25. The method of claim 24, wherein placing the tamper-proof gateway in the secure state comprises disabling a key associated with the encrypted sense information.

* * * * *